US008645489B1

(12) United States Patent (10) Patent No.: US 8,645,489 B1
Riggins et al. (45) Date of Patent: Feb. 4, 2014

(54) SYSTEMS AND METHODS FOR THE DEVELOPING CONTENT AND APPLICATIONS IN HOSTED AND NON-HOSTED DEVELOPMENT ENVIRONMENTS

(75) Inventors: Randy Karl Riggins, Oakland, CA (US); Thomas E. Bednarz, Jr., Natick, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1169 days.

(21) Appl. No.: 12/261,791

(22) Filed: Oct. 30, 2008

(51) Int. Cl.
*G06F 15/16* (2006.01)

(52) U.S. Cl.
USPC .......................................... 709/217; 717/124

(58) Field of Classification Search
USPC .......................................... 709/217; 717/124
See application file for complete search history.

(56) References Cited

U.S. PATENT DOCUMENTS

| | | | |
|---|---|---|---|
| 5,642,511 A | 6/1997 | Chow et al. | |
| 5,742,848 A | 4/1998 | Burgess | |
| 5,862,379 A | 1/1999 | Rubin et al. | |
| 5,870,088 A | 2/1999 | Washington et al. | |
| 6,178,432 B1 | 1/2001 | Cook et al. | |
| 6,425,120 B1 | 7/2002 | Morganelli et al. | |
| 6,425,121 B1 | 7/2002 | Phillips | |
| 6,480,860 B1 * | 11/2002 | Monday | 1/1 |
| 6,564,368 B1 | 5/2003 | Beckett et al. | |
| 6,569,207 B1 * | 5/2003 | Sundaresan | 715/234 |
| 6,618,854 B1 * | 9/2003 | Mann | 717/124 |
| 6,760,912 B1 * | 7/2004 | Yarsa et al. | 719/315 |
| 6,823,495 B1 | 11/2004 | Vedula et al. | |
| 7,159,185 B1 | 1/2007 | Vedula et al. | |
| 7,240,328 B2 | 7/2007 | Beckett et al. | |
| 7,340,721 B1 | 3/2008 | Bailey | |
| 7,730,410 B2 | 6/2010 | Goering | |
| 2002/0059054 A1 * | 5/2002 | Bade et al. | 703/20 |
| 2005/0172264 A1 * | 8/2005 | Yuknewicz et al. | 717/113 |
| 2007/0038931 A1 * | 2/2007 | Allaire et al. | 715/526 |
| 2008/0307385 A1 * | 12/2008 | Dreiling et al. | 717/108 |
| 2008/0313282 A1 * | 12/2008 | Warila et al. | 709/206 |
| 2010/0031167 A1 * | 2/2010 | Roytman | 715/760 |

OTHER PUBLICATIONS

Microsoft Corp, *Microsoft Office Access Non-Patent Literature Screenshots*, pp. 1-13.
L. Wang and M. Franz; "Automatic Partitioning of Object-Oriented Programs with Multiple Distribution Objectives;" Technical Report No. 07-11, Donald Bren School of Information and Computer Science, University of California, Irvine; Oct. 2007.

* cited by examiner

*Primary Examiner* — Thomas Dailey
(74) *Attorney, Agent, or Firm* — Kilpatrick Townsend & Stockton LLP (57) ABSTRACT

Certain embodiments of the present disclosure provide methods and systems for developing content and applications in both hosted and non-hosted environments, including developing interactive content and applications in such environments. Certain embodiments provide development application components that are used through a generic execution engine, for example, through a web browser and/or interactive media player technology that is available in both a hosted environment and a non-hosted environment. Elements of a user interface and other features of a traditional desktop application can thus be preserved from one environment to the other, which allows seamless migration of a development application. Certain embodiments use a service access component that is capable of talking to different development services, such as for example, using different remote procedure calls ("RPCs") to access remote services or simply accessing local services, depending on the environment.

22 Claims, 6 Drawing Sheets

PROVIDE A USER INTERFACE COMPONENT FOR EXECUTION BY AN INTERACTIVE MEDIA CONTENT PLAYER THAT CAN EXECUTE IN BOTH A HOSTED ENVIRONMENT AND A NON-HOSTED ENVIRONMENT
410

PROVIDE A BRIDGE COMPONENT FOR INTEGRATING THE INTERACTIVE MEDIA CONTENT PLAYER IN THE NON-HOSTED ENVIRONMENT
420

PROVIDE A SERVICE ACCESS COMPONENT THAT SELECTIVELY COMMUNICATES WITH DEVELOPMENT SERVICES ACCORDING TO THE ENVIRONMENT
430

PROVIDE A BRIDGE COMPONENT HAVING A CODE LIBRARY FOR BINDING AN INTERACTIVE MEDIA CONTENT PLAYER IN A LOCAL APPLICATION
510

ACCESS THE CODE LIBRARY TO SEND A COMMAND FROM THE INTERACTIVE MEDIA CONTENT PLAYER TO THE LOCAL APPLICATION
520

SYSTEMS AND METHODS FOR THE DEVELOPING CONTENT AND APPLICATIONS IN HOSTED AND NON-HOSTED DEVELOPMENT ENVIRONMENTS

FIELD

Embodiments of the present disclosure relate generally to the development of content and applications and specifically relate to computer software used to facilitate such development in multiple development environments.

BACKGROUND

Various software applications and other development tools facilitate the creation of content and applications. For example, some software development applications allow a developer to create media content such as web banners, site openers, showcase sites, and concept pitches. Developers can also use development applications to develop interactive content and content that otherwise includes objects and actions performed on those objects. An "action" is something that happens when content runs, including what a page or object within a page does. An action can describe motion (move, face, etc.) or interaction (play, go to link, etc.). Media content can involve various types of objects, including displayed objects such as squares, circles, other shapes, buttons, text, web links, images, movies, and objects that are not displayed.

Unfortunately, software applications and other development tools that facilitate the creation of content and applications are often useful in either a non-hosted environment, such as for example, as an application on a desktop machine, or in a hosted environment, such as for example, as an application provided through a web browser from a remote server. Generally, development applications are not well suited for use in both of these environments and/or for a developer wishing to switch back and forth between such environments. Generally, the features for a development application for a hosted environment must be created, changed, and maintained separately from the features of the same development application for a non-hosted environment. This may result in redundancy, inconsistency, and other problems between the different development environments.

SUMMARY

Certain embodiments of the present disclosure provide methods and systems for developing content and applications in both hosted and non-hosted environments, including developing interactive content and applications in such environments. Certain embodiments provide development application components that are used through an execution engine, such as for example, through a web browser and/or interactive media player application, that is available in both a hosted environment and a non-hosted environment. Elements of a user interface and other features of a traditional desktop application can thus be preserved from one environment to the other, for example, allowing seamless migration of a development application. In doing so, certain embodiments use a service access component that is capable of communicating with different development services, for example, using different remote procedure calls ("RPCs").

Certain embodiments of the present disclosure provide a method of providing a multi-environment computer application for developing other applications and content. One exemplary method provides such a development application by providing a user interface component for execution by an interactive media content player that can execute in both hosted and non-hosted environments. In a hosted environment, the development application accesses remote development services, such as from a remote server, and in a non-hosted environment the development application accesses local development services on the local computing device. Generally, some or all of the remote development services may provide the same or very similar services as are provided by the local development services.

In addition to providing the user interface component, this exemplary method further comprises providing a bridge component. A bridge component may implement the interactive media content player in the non-hosted environment by integrating the interactive media content player as part of the local application to provide the user interface. For example, if the player runs through a browser in a hosted environment, the bridge may provide a mechanism for the player functionality to operate within a local application. A bridge component may comprise a code library that implements a binding of the interactive media player in the local application. The bridge component may use various commands to link the player and the local application. In one embodiment, the bridge component uses declarative packets (for example, XML-formatted packets) to send commands to the local development services.

In addition to providing the user interface component and the bridge component, this exemplary method may also provide a service access component. A service access component allows the user interface component to be used in both the hosted environment and the non-hosted environment by selectively either communicating with the remote development services when the user interface is executing in the hosted environment or communicating with the local development services when the user interface is executing in the non-hosted environment. In one embodiment this involves automatically selecting an application controller feature connecting the service access component to appropriate development services. Examples of such application controller features include but are not limited to a desktop shim for a non-hosted environment or a hosted environment shim for a hosted environment.

In other embodiments, a computer-readable medium (such as, for example, random access memory or a computer disk) comprises code for carrying out these methods.

These embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Certain embodiments of the present disclosure provide methods and systems for developing content and applications in both hosted and non-hosted environments, including developing interactive content and applications in such environments. A hosted development environment is any environment in which a development application is hosted as a service provided across a network. For example, certain aspects of the development application may be facilitated from a remote server or otherwise received through a network such as the Internet. A hosted development environment may leverage web technologies such as web browsers and embedded media players to provide an application from a remote server or other provider. A hosted development environment can provide aspects of a development environment as a service based deliverable as opposed to a traditional desktop deliverable. A hosted environment may, for example, involve a service that a developer remotely logs into to access a development application. In contrast, a non-hosted development environment is any environment in which a development application is not remotely hosted.

The following specific illustrative embodiments are provided to introduce certain features of certain embodiments of the present disclosure and to illustrate some of the applications, uses, and benefits of various features. In certain embodiments, components of a development application utilize execution technologies (such as those available both within a non-hosted environment and within a hosted environment) to facilitate migration of development components between hosted and non-hosted environments. In some exemplary embodiments, a hosted development environment includes an interactive application that is sent to and executed by a media player that displays interactive content. A developer can interact within the development application through a user interface running on the media player to develop other applications and content. For example, a development application may be provided as an application that executes various features on an Adobe® Flash Player® embedded within a web page. In this example, a developer can navigate to the web page and access and use the development application through the Adobe® Flash Player®.

A version of this same development application may also be provided for a non-hosted environment. For example, it may reside as a stand alone application on a desktop computer, laptop computer, or other computing device. This version of the development application may include some of the same components that are designed to be executed by the media player. Thus, an exemplary development application may be provided as an application that executes various features on Adobe® Flash Player® technology within a desktop application. Those same features can execute on Adobe® Flash Player® technology in the web browser/hosted environment. Thus, generally, execution technology such as interactive media player technology can function in both the hosted and non-hosted environment to implement the same features of a development application. For example, the same user interface components designed to run through an Adobe® Flash Player® on a web browser could also run on a non-hosted application on a user's desktop through the same Adobe® Flash Player® technology.

This illustrative example is given to introduce the reader to the general subject matter discussed herein and is not intended to limit the scope of the disclosed concepts. While many of the examples above and herein often involve media player technology such as Adobe® Flash Player® technology, other technologies and components may be used instead. The following sections describe various additional embodiments and examples of methods and systems for developing content and applications in both hosted and non-hosted environments.

Illustrative Examples of Development Components that Run in Both Hosted and Non-Hosted Environments Certain embodiments provide development application components that are used through a generic execution engine, for example through a web browser or other type of interactive media player application available in both a hosted environment and a non-hosted environment. The execution engine is "generic" in the sense that it is usable or suitable in a variety of contexts. Elements of a user interface and other features of a traditional desktop application can be preserved from one environment to the other, for example, for seamlessly migrating the development application for use in a hosted environment.

Certain embodiments use a service access component to allow the same user interface and other features to be used in both hosted and non-hosted environments. An object, service, or facility inside of the service access component may comprise operations available to the user interface and other features. The service access component may also be capable of communicating with different development services through an application controller, for example, using different RPCs or other commands to access remote services or local services. For example, in a hosted environment, a user's computer that is accessing a remote server may include front end software for interfacing across the network to a back end. The user interface and other common code may be packaged in one media player file or other package and, depending on a run time configuration, an appropriate application controller of the service access component may be loaded, such as a desktop shim for a non-hosted environment or a hosted environment shim for a hosted environment. A shim is a small library or collection of classes, routines, or other features that converts one application programming interface into another. The service access component could then interact with the user interface and other common code and communicate with whichever environment instance it was configured for with the appropriate shim. The code and implementation for the user interface and other features can thus be the same in a non-hosted desktop environment and in a hosted environment. Such code and implementation details would only have to be changed in one place. For example, if a new feature was added to the development application, it could be created once and appear in both environments.

Various features may be implemented by the code and implementations details that are the same for both environments including, but not limited to, a layout view or appearance of a development application and many of the individual tools that are available within such a development application. Features handling user input, user mouse operations, and user selections, for example, clicking and dragging may be provided by common state machine implementation details.

In addition, a preview feature that allows an application developer to preview an application could be provided as part of the code and implementation details that are the same for both environments.

In certain embodiments, the application development model may dictate a discrete factoring of the functionality. For example, the user interface appearance and all commands from the user may be controlled by common front end components, while the back end may be reserved for data storage, data manipulation, functionality for building the application files, etc. Large component files, such as image files could be stored differently depending on the configuration, for example, on a local hard drive or in a cloud service. In such a case, a service access component or its application controller may handle the differing scenarios for storing and accessing component files.

Illustrative Examples of Development Application Components that Differ Depending on the Environment Certain embodiments provide a user interface and other features that could operate in a slightly different fashion given the target environment. For example, if integration with an image editing application is not available during use through a browser in a hosted environment, the interface may turn off an entire section of functionality related to the image editing application. As another example, in a hosted environment accessing and saving files to a server may involve latency issues not present when running on a desktop. On the desktop an RPC call and other communications across two processes on the same machine would be almost instantaneous. Differences in various accessing and saving features could address this latency difference. On the other hand, there may be services that would only be available in the hosted environment, for example, document management features for seeing changes that another user has made and propagating such changes across different machines.

Accordingly, a user interface and other features may be adapted to potential differences in operating environments. These different versions of the development application could be reflected as differentiators in different software offerings. For example, a light, hosted version of the application development application may be targeted to educational uses or for use with a set of functionality that is available only over the Internet. In contrast, a desktop development environment may have the same general front end but also include unique functionality for handling high bandwidth video or dealing with large image files and/or other features enabled on the desktop development environment given the advantages of a local back end. Generally, however, although configured slightly differently both the hosted and non-hosted development environments may build on the same code base and/or other common front end components.

Exemplary Components of a Development Application

Figure 1:
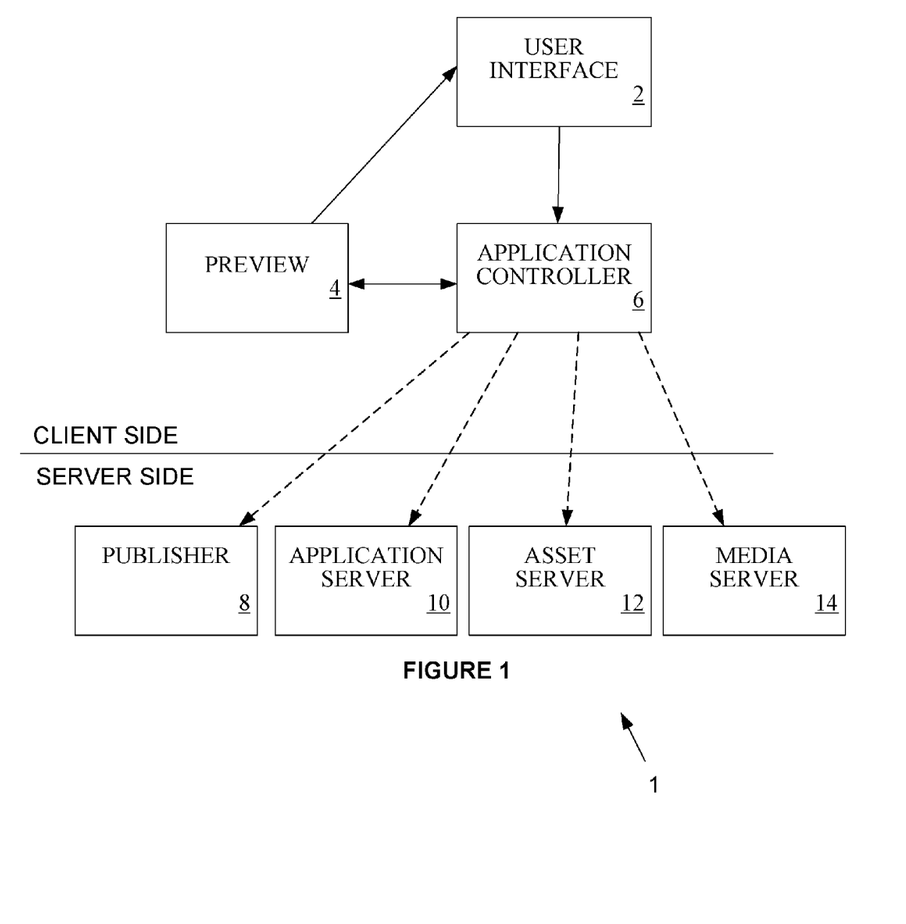
FIG. 1 is a system diagram illustrating exemplary client side and server side components for providing an exemplary development application.

Referring now to the drawings in which like numerals indicate like elements throughout the several Figures, FIG. 1 is a system diagram 1 illustrating exemplary client side and server side components for providing an exemplary development application. A variety of configurations, components, and features are alternatively possible. The components described here are provided merely for illustrative purposes to illustrate some but not all embodiments.

The client side comprises a user interface 2, a preview engine 4, and an application controller 6. The user interface 2 may be used to display an editing canvas, a code editor, and/or other application development interface components to allow a user to create media content and applications. The user interface 2 may also comprise various specific tools that a user may use to develop content and applications on the user interface 2.

The preview engine 4 may be used to mimic the runtime behavior of a media content application being developed on the user interface 2. The user interface 2 and preview engine 4 may operate using some or all of the technologies that will execute the developed content or application. For example, if the development tools facilitate development of an application that can be run on an Adobe® Flash® player, the user interface 2 and preview engine 4 can include actual Adobe® Flash® technologies to facilitate the display and preview of objects, actions, and other aspects. Accordingly, a virtual machine can be used that effectively runs an Adobe® Flash® player.

The application controller 6 may be used to associate appropriate back end or server side components and other services, for example, the appropriate back end server for the present development environment, for example, hosted or non-hosted. The application controller 6 may control publishing/generating content and applications based on the information specified on the editing interface by sending appropriate communications to a publisher 8 on the server side. The application controller 6 may also interact with an application server 10, as asset server 12, and a media server 14 to get information about objects, actions, and other information useful in, among other things, compiling content or applications being developed.

Illustrative Examples of Different Development Environments

Figure 2:
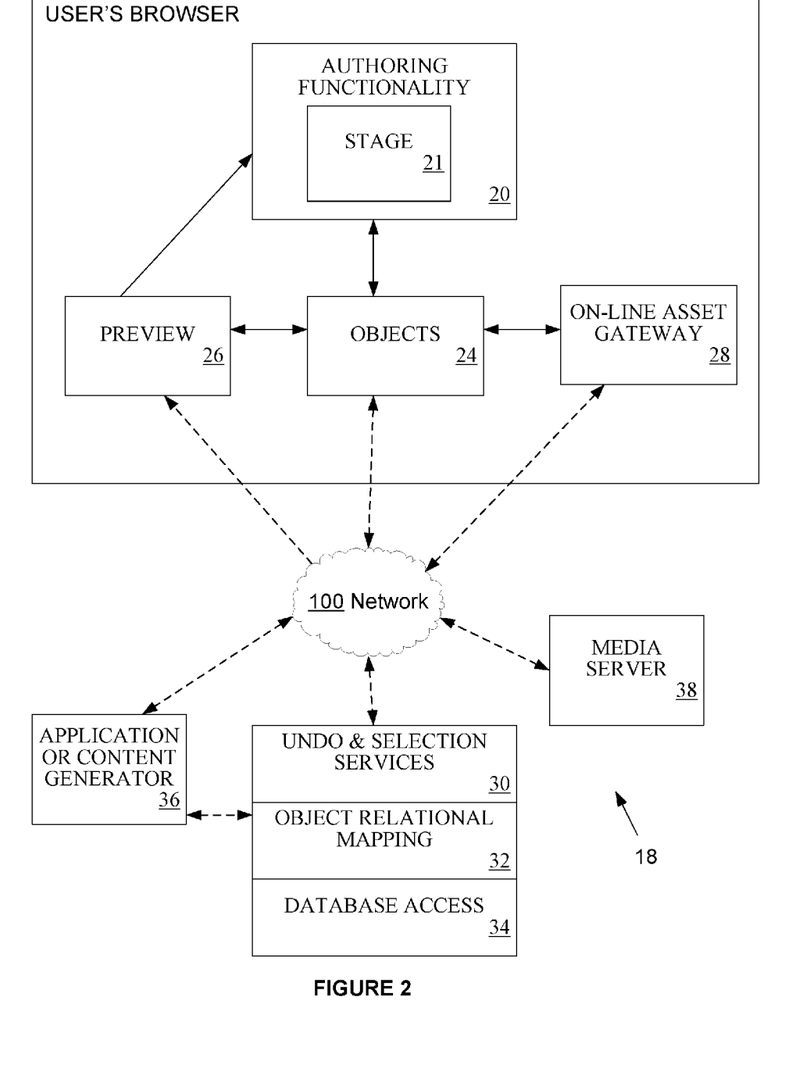
FIG. 2 is a system diagram illustrating an exemplary hosted development environment.
Figure 3:
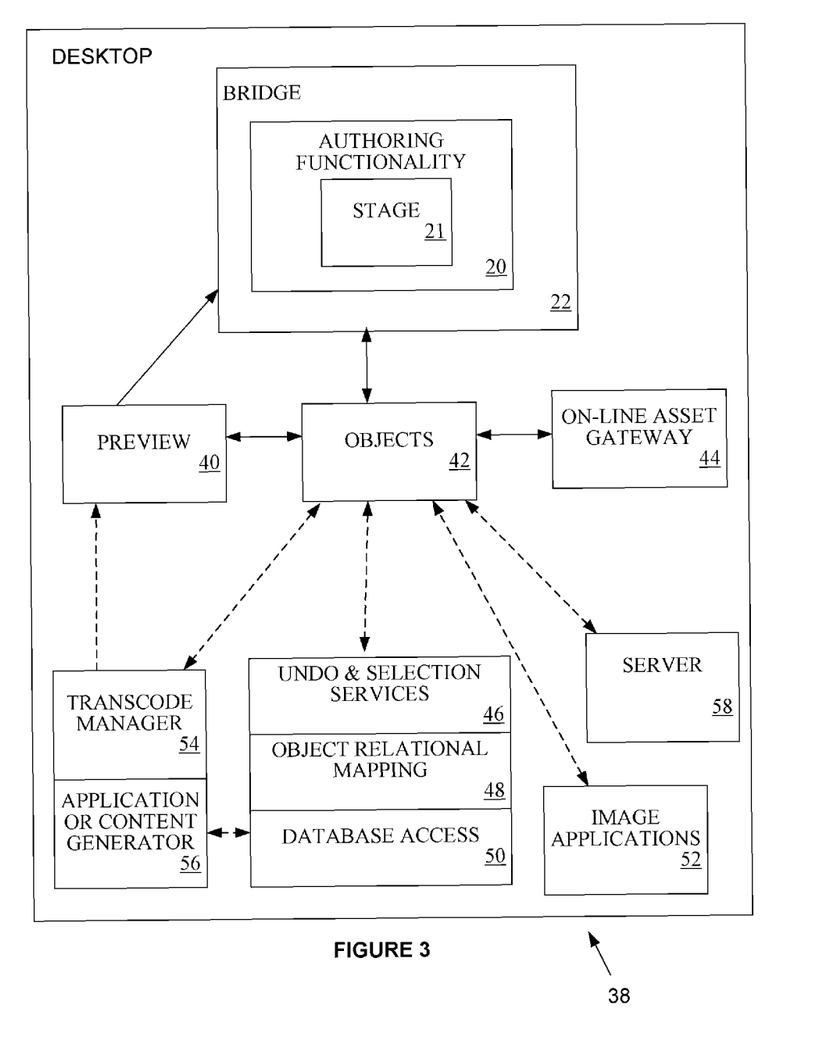
FIG. 3 is a system diagram illustrating an exemplary non-hosted development environment.

FIG. 2 is a system diagram illustrating an exemplary hosted development environment 18 while FIG. 3 is a system diagram illustrating an exemplary non-hosted development environment 38. Both the hosted development environment 18 and the non-hosted development environment 38 include the same or substantially the same authoring functionality 20, including a stage 21 providing functionality related to the actual display of the objects on the stage. For example, the stage 21 may comprise user interface code that provides editing affordances, etc., and interoperates with an underlying object model. The stage 21 may render an object model and allow users to make changes to underlying data.

Certain embodiments provide a content authoring application that can be migrated between two different environments 18, 38 and that can do so in a way that preserves this group of functionality 20. As illustrated in FIG. 3, a desktop environment can use a bridge 22 for the authoring functionality 20. The bridge 22 may be a library that a desktop application can use to embed a media player. A bridge 22 may thus provide a connection from the dynamic media environment of the authoring functionality 20 into the host, desktop application on which it resides. For example, a bridge could comprise a code library that implements a binding of a media player to a local application such as a native or desktop application.

In FIG. 2, the exemplary hosted development environment 18 further comprises a preview function 26, objects 24, and an on-line asset gateway 28 within the user's browser. Objects 24 may comprise an abstract data model of a project being authored. Objects 24 may contain high level entities such as a project, a set of model or prototype objects, instances of components within a project, containers of components, and relations between entities within the model. The preview function 26 provides a mechanism where services, for example, a bound virtual machine, are used to provide a full fidelity rendition of authoring data such that it appears as it would in the final, optimized form. An online-asset gateway 28 can provide a mechanism to address and access assets that may be on a cloud storage system. It may abstract such cloud storage systems for seamless access.

Generally, these features 26, 24, 28 connect through network 100 to an application or content generator 36, various undo and selection services 30, object relational mapping services 32, database access services 34, and a media server 38. Undo and selection services 30 may include a high-level state machine that tracks changes made to underlying objects and allows these changes to be rolled back or re-applied, such that the underlying model's state is the same before and after the change occurred. Object relational mapping services 32 may facilitate the implementation of an object oriented data model using a different model, such as a relational database. This component may abstract the complexity of mapping object instances and properties to tables in a relational data store. The database access services 34 may provide libraries to abstract the particular relational database that is employed. The media server 38 may comprise a server or library that exposes functionality to process and manipulate raw assets. For example, a server can take a photo file and perform various editing operations on it (for example, render each layer in the file to another type of file, etc.) The application or content generator 36 can be used to compile an object model representation of authoring data into a final form for a player runtime.

In FIG. 3, the exemplary non-hosted environment 38 comprises many of the same component illustrated in the hosted environment of FIG. 2. FIG. 3 further illustrates the non-hosted environment including preview 40 and objects 42 components that connect directly to various remote development services, such as a transcode manager 54, an application or content generator 56, various undo and selection services 46, object relational mapping services 48, database access services 50, image applications 52, and a server 58 that provides various media encoder, media core, and A/V services. The on-line gateway may connect to an external network (not shown). The transcode manager 54 can transform assets. For example, in the case of video assets, a transcode manager 54 may transform source media into highly optimized files for rendering in a media player.

Illustrative Examples of Developing in Both Hosted and Non-Hosted Environments

Figure 4:
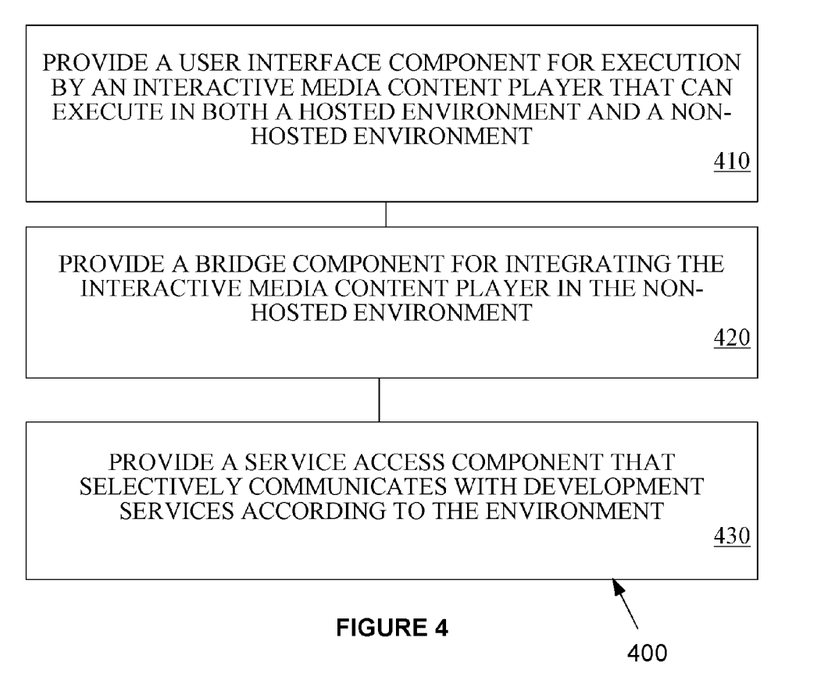
FIG. 4 illustrates an exemplary method of developing content and applications in both hosted and non-hosted environments.

Certain embodiments of the present disclosure provide methods of providing a computer application for developing other applications and content in both hosted and non-hosted environments. FIG. 4 illustrates one such exemplary method of developing content and applications in both hosted and non-hosted environments. The method 400 of FIG. 4 provides a user interface component for execution by an interactive media content player that can execute in both environments, as shown in block 410. When in the hosted environment, the development application accesses remote development services, for example, from a remote server, and in a non-hosted environment the development application accesses local development services on the local computing device. Generally, some or all of the remote development services may provide the same or very similar services as are provided by the local development services.

The exemplary method 400 of FIG. 4 further provides a bridge component for integrating the interactive media content player in the non-hosted environment, as shown in block 420. For example, a bridge component may implement the interactive media content player in the non-hosted environment to provide the user interface in the local application.

Figure 5:
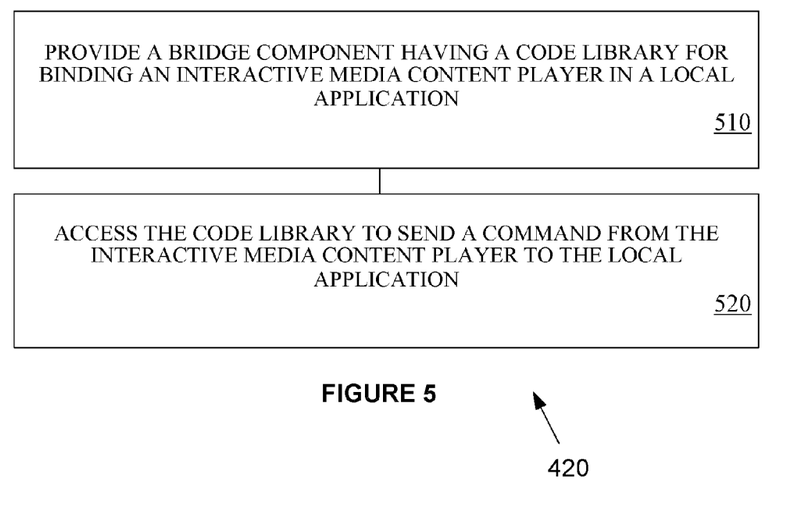
FIG. 5 illustrates an exemplary method of providing a bridge component.

FIG. 5 illustrates an exemplary method 420 of providing such a bridge component. This exemplary method 420 comprises providing a bridge component having a code library for binding an interactive media content player in a local application, as shown in block 510 of FIG. 5. Such a code library may be used to allow executable aspects of the media content player to execute as part of the local application by converting commands from media content player to commands performed by the local application.

The method 420 further comprises accessing the code library to send a command from the media content player to the local application, as shown in block 520 of FIG. 5. For example, in one embodiment, the bridge component uses declarative packets (for example, XML-formatted packets) determined using the code library to send commands to the local development services.

Returning to FIG. 4, in addition to providing the user interface component and the bridge component, this exemplary method 400 may also provide a service access component, as illustrated in block 430. A service access component may allow the user interface component to be used in both the hosted environment and the non-hosted environment by selectively communicating with the remote development services when the user interface is executing in the hosted environment and communicating with the local development services when the user interface is executing in the non-hosted environment. This may involve selecting an application controller feature connecting the service access component to appropriate development services.

Figure 6:
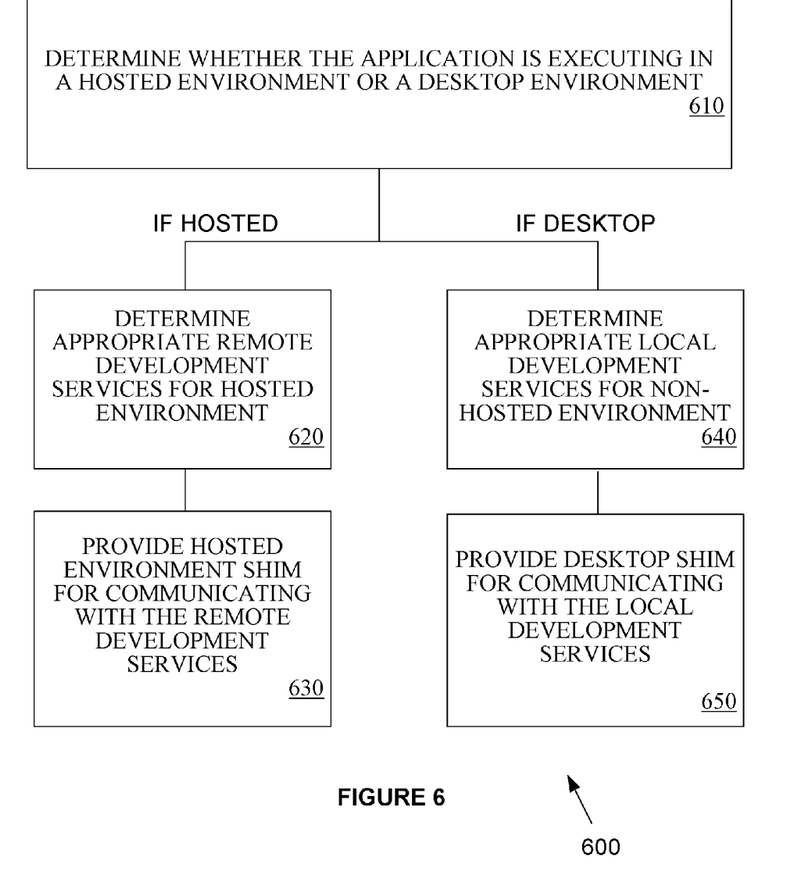
FIG. 6 illustrates an exemplary method of selectively accessing development services depending on the environment.

As one example a service access component selectively accessing services, FIG. 6 illustrates an exemplary method 600 of selectively communicating with development services depending on the environment. This exemplary method 600 comprises determining whether a development application is executing in a hosted environment or a non-hosted desktop environment, as shown in block 610. Depending on the environment, appropriate development services are identified or otherwise determined. For example, the method may involve receiving input identifying which type of environment the application is being used in. As another example, the method may involve sending one or more test operations, procedure calls, or other communications to automatically determine the current executing environment. The determination of operating environment may be made when a development application is first launched and repeated during use of the application. In some cases, the application may change environments during use and the application may automatically adapt itself without requiring manual re-launching of the application.

Returning to FIG. 6, if the application is executing in the hosted environment, appropriate remote services are selected, as shown in block 620, and a hosted environment shim is provided for communicating with these services, as shown in block 630. However, if the application is executing in the desktop environment, appropriate local services are identified, as shown in block 640, and a desktop shim is provided for communicating with these local services on the desktop, as shown in block 650. Also depending on the environment various features of the user interface and other common components may be selectively activated or deactivated. In other words, an application may use the same general user interface in different environment but allow various user interface parameters and features to adjust based on the particular operating environment.

General

Certain embodiments relate to developing content and applications in both hosted and non-hosted environments. The techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software applications that execute on each of the devices and functions performed thereon are shown in the Figures as functional or storage components on the respective devices. As is known to one of skill in the art, such applications may be resident in any suitable computer-readable medium and execute on any suitable processor. For example, the devices each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While a network may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs. The server devices may be single computer systems or may be implemented as a network of computers or processors. Examples of a server device are servers, mainframe computers, networked computers, a processor-based device, and similar types of systems and devices.

That which is claimed is:

1. A method comprising:

providing a media package comprising code for a user interface component for execution by an interactive media content player capable of executing in both a hosted environment and a non-hosted environment, wherein the code for the user interface component is the same for the hosted environment and the non-hosted environment, wherein the hosted environment provides a user interface through the interactive media content player and accesses remote development services, and wherein the non-hosted environment provides the user interface as part of a local application on a local computing device and accesses local development services on the local computing device, and wherein at least one of the remote development services provides the same services as at least one of the local development services;

providing a bridge component that implements the interactive media content player in the non-hosted environment to provide the user interface in the local application; and providing a service access component that allows the user interface component to be used in the hosted environment or the non-hosted environment, the service access component communicating with the remote development services when the user interface is executing in the hosted environment and communicating with the local development services when the user interface is executing in the non-hosted environment.

2. The method of claim 1, wherein the bridge component comprises a code library that implements a binding of the interactive media player in the local application.

3. The method of claim 1, wherein the bridge component uses declarative packets to send commands to the local development services.

4. The method of claim 1, wherein the remote development services and the local development services each provide different mechanisms for data storage, data manipulation, and functionality for building the application files.

5. The method of claim 1, wherein the remote development services and the local development services each provide undo services.

6. The method of claim 5, wherein the undo services comprise tracking changes and for roll back and re-application.

7. The method of claim 1, wherein the remote development services and the local development services each provide object relational mapping services.

8. The method of claim 7, wherein the object relational mapping services provide object properties to a table in a relational data store.

9. The method of claim 1, wherein the remote development services and the local development services each provide database access services.

10. The method of claim 1 further comprising automatically selecting an application controller feature, the application controller feature connecting the service access component to appropriate development services.

11. The method of claim 10, wherein the application controller feature comprises a desktop shim for the non-hosted environment or a hosted environment shim for the hosted environment.

12. The method of claim 1 further comprising providing a layout view for use by the interactive media content player in both the hosted environment and the non-hosted environment.

13. The method of claim 1 further comprising handling user input operations on the interactive media content player in both the hosted environment and the non-hosted environment.

14. The method of claim 1 further comprising providing a preview component for use by the interactive media content player in both the hosted environment and the non-hosted environment, the preview component providing a preview of content being developed.

15. The method of claim 1, wherein the user interface is adapted to provide different features depending on executing environment.

16. A system comprising:
   a processor coupled to storage memory;
   instructions stored in said storage memory, wherein said instructions provide:
      a media package comprising code for a user interface component for execution by an interactive media content player capable of executing in both a hosted environment and a non-hosted environment, wherein the code for the user interface component is the same for the hosted environment and the non-hosted environment, wherein the hosted environment provides a user interface through the interactive media content player and accesses remote development services, and wherein the non-hosted environment provides the user interface as part of a local application on a local computing device and accesses local development services on the local computing device, and wherein at least one of the remote development services provides the same services as at least one of the local development services;
      a bridge component that implements the interactive media content player in the non-hosted environment to provide the user interface in the local application; and
      a service access component that allows the user interface component to be used in the hosted environment or the non-hosted environment, the service access component communicating with the remote development services when the user interface is executing in the hosted environment and communicating with the local development services when the user interface is executing in the non-hosted environment.

17. The system of claim 16, wherein the bridge component comprises a code library that implements a binding of the interactive media player in the local application.

18. The system of claim 16, wherein the bridge component sends declarative packet comprising commands to the local development services.

19. The system of claim 16, wherein the remote development services and the local development services each provide different mechanisms for data storage, data manipulation, and functionality for building the application files.

20. The system of claim 16, wherein the service access component automatically selects an application controller feature, the application controller feature connecting the service access component to appropriate development services.

21. The system of claim 20, wherein the application controller feature comprises a desktop shim for the non-hosted environment or a hosted environment shim for the hosted environment.

22. A non-transitory computer-readable medium on which is encoded program code, the program code comprising:
   program code for providing a media package comprising code for a user interface component for execution by an interactive media content player capable of executing in both a hosted environment and a non-hosted environment, wherein the code for the user interface component is same for the hosted environment and the non-hosted environment, wherein the hosted environment provides a user interface through the interactive media content player and accesses remote development services, and wherein the non-hosted environment provides the user interface as part of a local application on a local computing device and accesses local development services on the local computing device, and wherein at least one of the remote development services provides the same services as at least one of the local development services;
   program code for providing a bridge component that implements the interactive media content player in the non-hosted environment to provide the user interface in the local application; and
   program code for providing a service access component that allows the user interface component to be used in the hosted environment or the non-hosted environment, the service access component communicating with the remote development services when the user interface is executing in the hosted environment and communicating with the local development services when the user interface is executing in the non-hosted environment.

* * * * *